D. J. ANGUS.
MEANS FOR TREATING CROWNS.
APPLICATION FILED MAY 25, 1917.

1,354,530.

Patented Oct. 5, 1920.
5 SHEETS—SHEET 1.

Inventor:
Donald J. Angus
by his Attys:
Philipp Sawyer Rice & Kennedy

D. J. ANGUS.
MEANS FOR TREATING CROWNS.
APPLICATION FILED MAY 25, 1917.
1,354,530.
Patented Oct. 5, 1920.
5 SHEETS—SHEET 3.
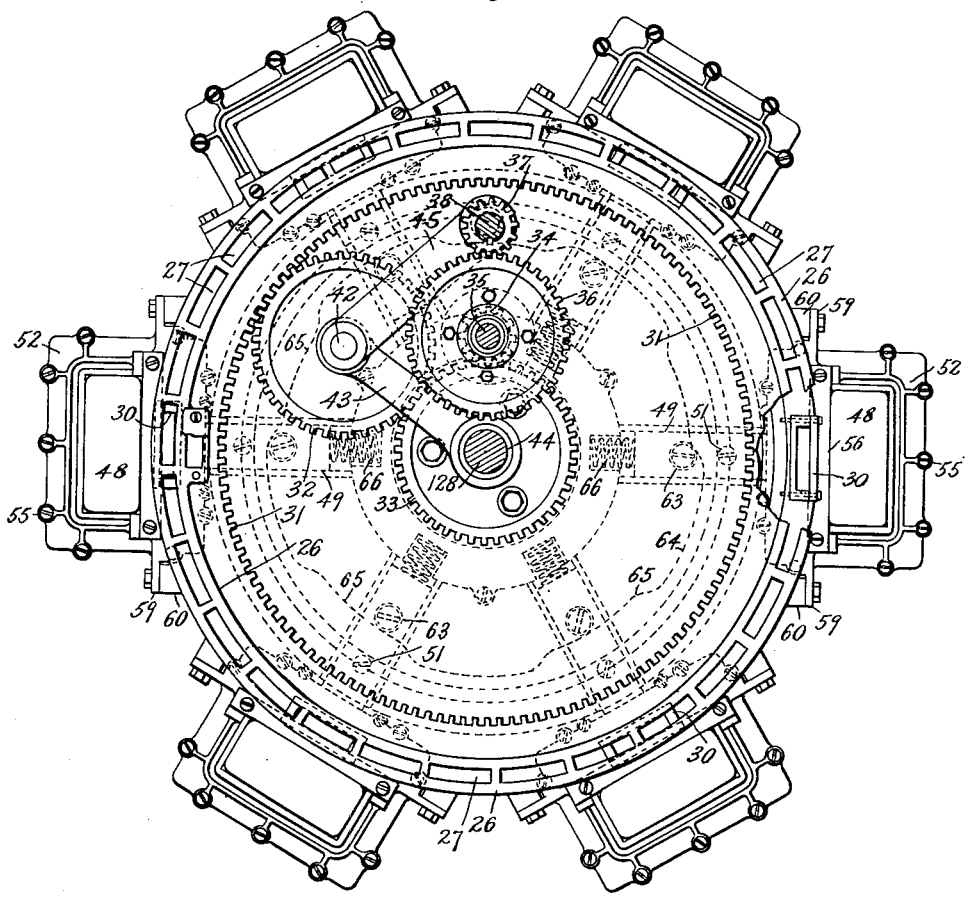
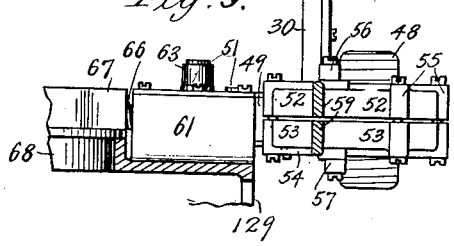
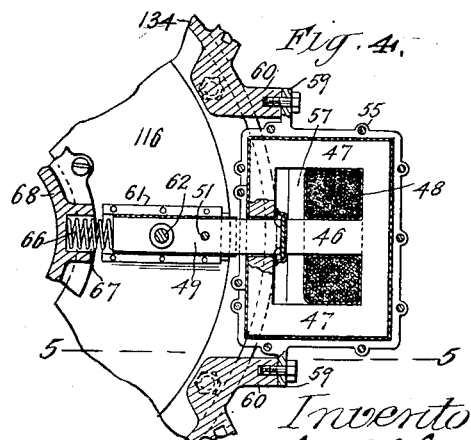

D. J. ANGUS.
MEANS FOR TREATING CROWNS.
APPLICATION FILED MAY 25, 1917.
1,354,530.
Patented Oct. 5, 1920.
5 SHEETS—SHEET 4.
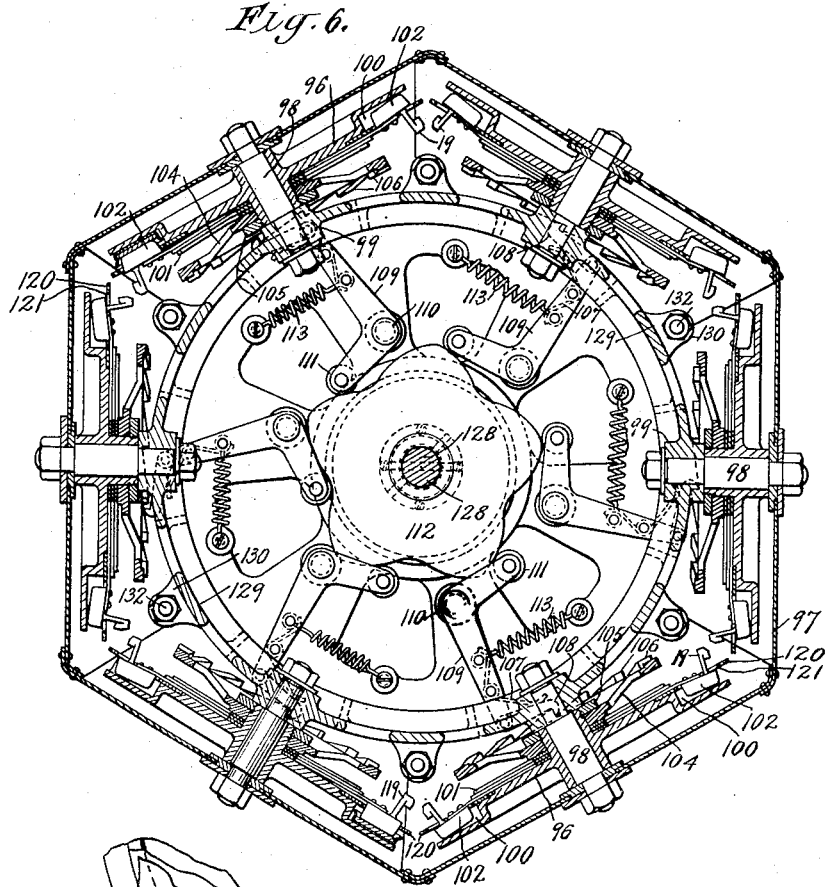
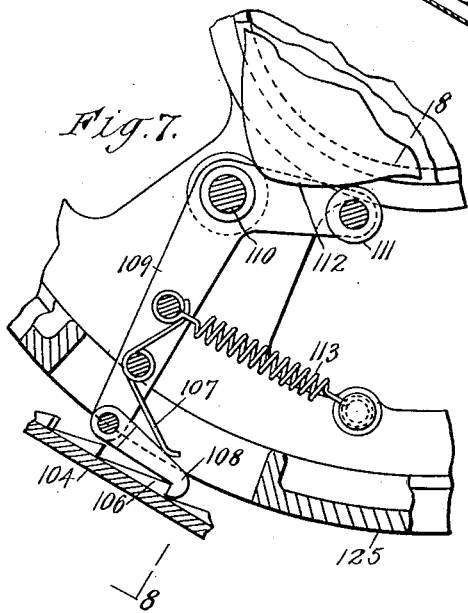
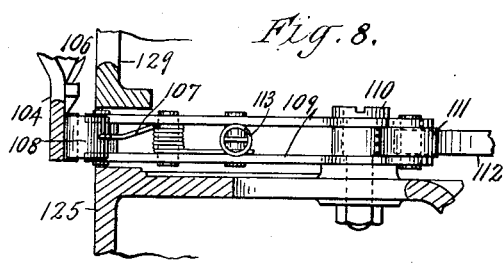
Inventor:
Donald J. Angus
by his Attys:
Phillipp Sawyer Rice & Kennedy D. J. ANGUS.
MEANS FOR TREATING CROWNS.
APPLICATION FILED MAY 25, 1917.
1,354,530.
Patented Oct. 5, 1920.
5 SHEETS—SHEET 5.
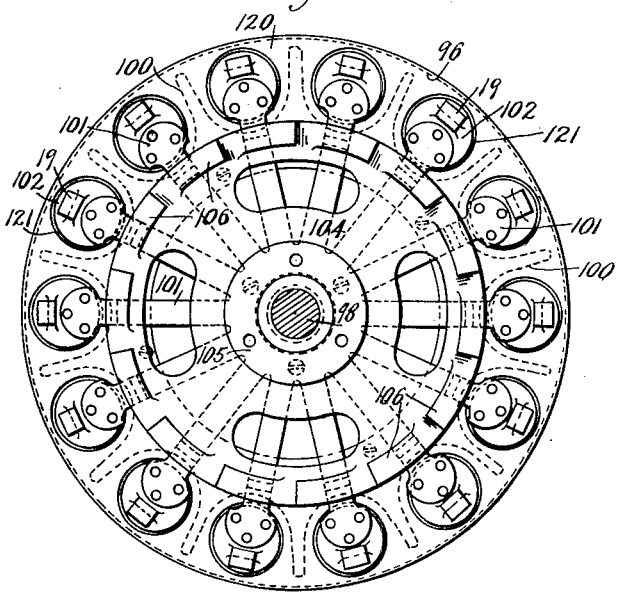
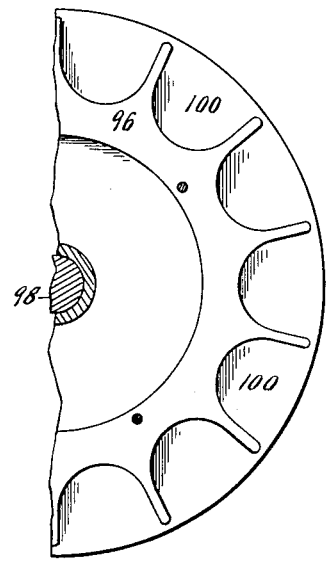
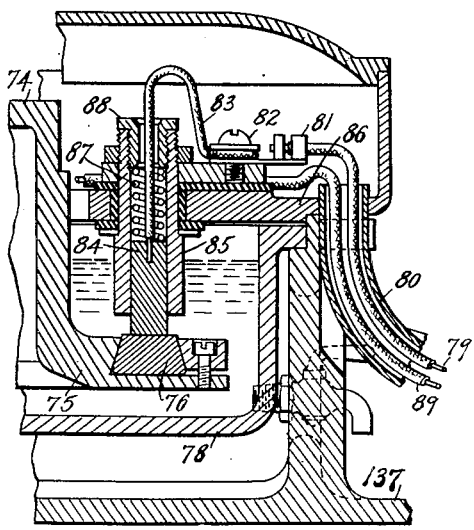
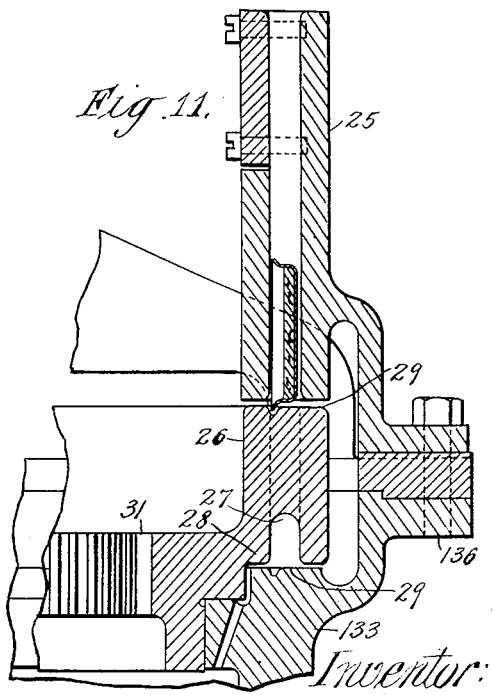

UNITED STATES PATENT OFFICE.

DONALD J. ANGUS, OF INDIANAPOLIS, INDIANA, ASSIGNOR TO THE CROWN CORK AND SEAL COMPANY OF BALTIMORE CITY, OF BALTIMORE, MARYLAND, A CORPORATION OF MARYLAND.

MEANS FOR TREATING CROWNS.

1,354,530.  Specification of Letters Patent.  Patented Oct. 5, 1920.

Application filed May 25, 1917. Serial No. 171,051.

*To all whom it may concern:*

Be it known that I, DONALD J. ANGUS, a citizen of the United States, residing at Indianapolis, county of Marion, and State of Indiana, have invented certain new and useful Improvements in Means for Treating Crowns, fully described and represented in the following specification and the accompanying drawings, forming a part of the same.

This invention relates to a means for treating crowns.

Crowns, as the term is ordinarily used, include a metal shell or cap, a disk of cork, and a disk of impregnated paper or the like for cementing the cork disk in place. In preparing crowns for use, the customary procedure is to heat the assembled crown to such an extent that the impregnation softens, and thereafter the crown is cooled under pressure, whereby the cork disk is firmly cemented in place. Methods of carrying on this procedure as heretofore known, have been subject to certain disadvantages. For example, when crowns are moved across a heated plate, as in one of the well-known methods of effecting this cementing, the high temperature required and the friction on the heated crowns are oftentimes injurious to the finish of the crowns, and this is particularly objectionable when the crowns bear lithographing.

It is the object of the present invention to provide a means for treating crowns such that the cork disks are cemented in place without excessive heating of the crowns and without undue friction, and at the same time to attain this end by means which permit uniform heating, high speed, reliability, economy and other characteristics resulting in a commercially successful product.

The novel features of the present invention comprise means setting up eddy currents in the tin of an assembled crown. In the practical carrying out of the invention to the best advantage, the assembled crowns are placed between the poles of a magnetic core, the core subjected to induced currents, and the crowns cooled under pressure.

The following specification describes, and the accompanying drawings illustrate, apparatus suitable for carrying out the invention, it being understood that changes may be made in the form, construction and arrangement of the parts without departing from the spirit of the invention, the form herein disclosed being merely a preferred embodiment thereof.

In the drawings—

Fig. 3 is a longitudinal sectional view, taken on the line 3—3 of Fig. 2;

Fig. 4 is a longitudinal cross section taken through one of the heating heads;

Fig. 5 is a cross-sectional view taken on the line 5—5 of Fig. 4;

Fig. 6 is a view similar to Fig. 3, taken on the line 6—6 of Fig. 2;

Fig. 7 is a detail view (enlarged) of a portion of Fig. 6;

Fig. 8 is a cross-sectional view taken on the line 8—8 of Fig. 7;

Fig. 9 is a view in front elevation of a portion of the cooling wheel;

Fig. 10 is a similar view of the stripper plate;

Fig. 11 is a detail view showing in vertical section a portion of the crown feeding means;

Fig. 12 is an enlarged view showing in detail a portion of Fig. 2; and

Figure 1:
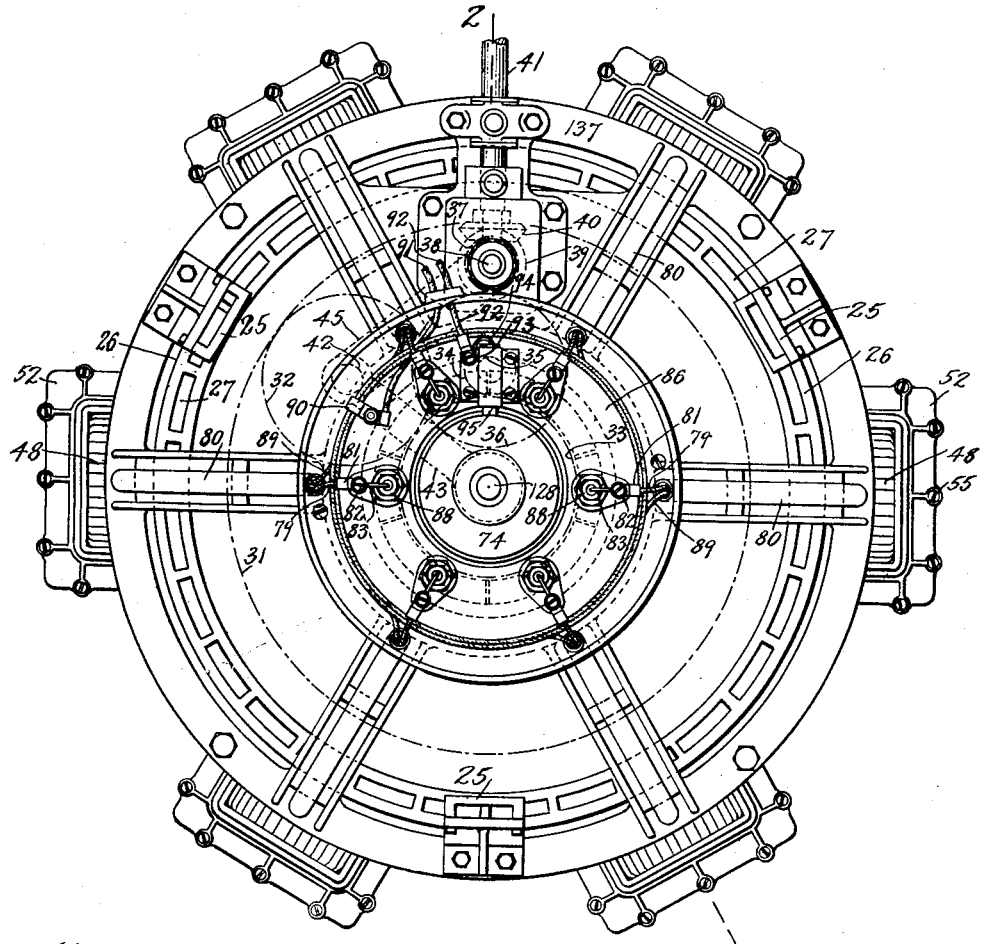
Figure 1 is a top plan view of a machine for treating crowns, constructed in accordance with the invention.

Referring to the drawings, the apparatus is carried by an open bottomed circular base 125 having a bolt flange 126 by which it may be suitably supported as desired, for example, above inspection belts. The top of this base is of a spider formation, the central part being dished to form a bearing 127 for a central drive shaft 128. To this base is secured a lower supporting frame 129 which is cylindrical in form with a narrow annular bottom and a wider annular top. Lugs 130 on this frame are secured to lugs 131 on the top of the base by suitable bolts 132 to connect the two parts. On the top of the lower supporting frame is mounted an intermediate support 133 which is an annular member having six depending wings 134 on which are formed lugs 135 which are bolted to corresponding lugs on the lower supporting frame 129. At the top of this intermediate support is a flange 136 to which is secured an upper supporting frame 137.

The apparatus includes, as hereinafter appears, six heating heads, and means is provided for feeding assembled crowns to these heating heads so as to maintain an unbroken supply. While this may be accomplished by various constructions, in the form shown, bolted to the flange 136 and equally spaced about the circumference thereof is a plurality (in this instance three) of vertical crown receiving chutes 25 into which assembled crowns are placed in any suitable manner. Rotating beneath these chutes is a crown distributing wheel 26 having near its edge a relatively large number of vertical pockets 27 located to register with the chutes 25 as the wheel revolves, so that as an empty pocket passes a chute, it receives a crown. The wheel has a shouldered offset portion 28 which has a bearing on a shouldered portion of the annular intermediate supporting member 133, as appears in Fig. 11, and in order to hold the crowns in the distributing wheel, as the latter revolves, directly beneath the pockets 27, the intermediate supporting member 133 is formed with an annular flat surface 29 which serves as a crown-retaining plate, a groove being formed in the flat surface 29, for the edge of the crown, as appears in Fig. 11. At six equally spaced intervals, this crown-retaining surface is recessed to receive vertical crown feed chutes 30 which register with the pockets 27 and which lead to the heating heads. Assembled crowns are fed to the receiving chutes 25 in any suitable manner and they drop into the pockets of the rotating distributing wheel. The crowns are retained in the pockets of the distributing wheel by the surface 29 except when a pocket registers with one of the feed chutes 30, when the crown is free to drop into the chute. As the wheel pockets are relatively greater in number than the feed chutes, the latter are always sufficiently supplied to meet the demands of the heaters.

The invention includes means for rotating the distributing wheel in such manner that it will make a slight pause when a pocket is in register with a feed chute to permit the crown to drop into the chute. Although capable of variation within a wide range, in structures embodying the invention to the best advantage, the distributing wheel has a gear continuously in mesh with a gear driven steadily and non-intermittently and the intermittent movement of the distributing wheel is attained without the use of ratchet mechanisms, locking devices and the like. Although capable of various constructions, in the form illustrated, the inner surface of the offset portion 28 of the distribution wheel is formed with teeth 31 so as to be in effect a large internal spur gear. Meshing with this gear is an idler 32 which in turn meshes with a pinion 33 bolted to a member hereinafter described, which is keyed to the central shaft 128. The central shaft is driven through this connection, the pinion 33 meshing with a small driving pinion 34 on a stud 35 having bolted thereto a gear 36 meshing with a pinion 37 on a vertical drive shaft 38 which carries a bevel gear 39 driven by a similar gear 40 on a horizontal power shaft 41, the latter being suitably connected with a source of power. Bearings for these shafts are provided by the upper supporting member 137. The pivotal stud 42 of the idler 32 is suspended from an arm 43 pivotally carried by the bearing 44 of the central shaft and mounted on this pivotal stud 42 is a crank 45 reciprocated by the drive shaft 38, the stroke of this crank reciprocating the idler 32. If the latter were freely suspended, it would merely travel around the gear 31 without driving the same, and this is the effect produced by the retarding stroke of the crank 45 which thus momentarily suspends the driving action of the idler and allows the distributing wheel to pause long enough to permit a crown to drop to the feed chutes 30. The return stroke of the crank accelerates the movement of the idler and the resulting forward movement of the wheel is correspondingly rapid, thereby compensating for the pause.

The invention includes means for setting up eddy currents in the tin of the crowns themselves, thereby to heat the crowns internally, and in constructions embodying the invention to the best advantage, this is accomplished by placing crowns between the poles of a core and setting up in the core induced currents. Although this may be accomplished by various constructions, in the one illustrated, under each of the feed chutes 30 is a heating head having a stationary portion and a movable portion. The stationary part comprises a stationary core 46, a yoke 47 and a coil 48. As appears more clearly in Fig. 4, the core and yoke together are substantially E-shaped, the core forming the central tongue of the E. These two parts are laminated structures formed of any suitable material, such as transformer steel, and are substantially square in cross-section. The coil is wound about the core within the yoke, as shown in Fig. 4. The movable part of the heater is a part of the core and comprises a reciprocating plunger 49, also a laminated structure formed of transformer steel or other suitable material, and of a cross-section the same in size as that of the stationary core portion 46. This plunger is clamped between plates 50 by a bolt 51, its end fitting between the upturned edge of the yoke. The corners of the inner end of the core plunger are cut away, as shown in Fig. 4, so that the end fits roughly within the skirt of a crown.

Figure 2:
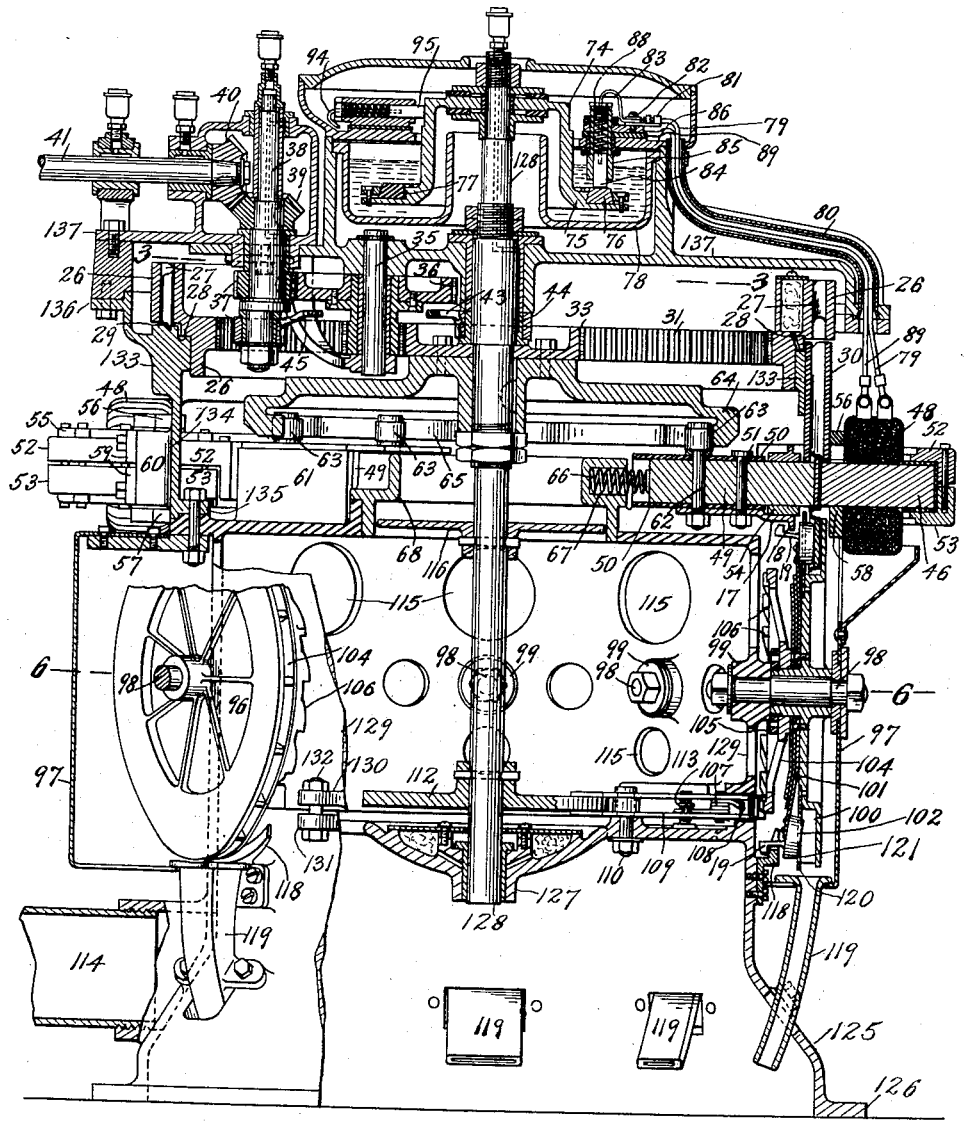
Fig. 2 is a vertical section of the same, taken on the line 2—2 of Fig 1.

To hold the heating head in place and to inclose the yoke 47, housings are provided in the form of two-part frames. The upper frame 52 is rectangular in shape and of a size to embrace the rear face and sides of the coil and to extend out from the front face thereof, the front edge being recessed to accommodate the upper half of the plunger 49. The lower frame 53 is substantially the same size and shape except that the front side is cut away, and inserted in the opening is a plunger guide bar 54 which embraces the lower half of the plunger. Both upper and lower frames have a number of bosses 55 carrying screws or bolts by means of which the two frames are secured together, as shown, for example in Fig. 1. To hold the coils in position upper and lower retaining bars are provided. The upper retaining bar 56 extends across the top of the upper frame and is secured thereto, so as to lie up against the front face of the coil to clamp the coil against the rear of the yoke. The front edge of this bar is recessed to accommodate the vertical feed chute 30. The lower retaining bar 57 is secured to the lower frame, so as to lie across the front face of the coil in the same manner as the other bar, and it has an upwardly extending portion 58 which serves as a support for the end of the core, as shown in Fig. 2. The heater heads are carried by the intermediate support 133 and to this end both upper and lower housing frames have at each side lugs 59 through which pass bolts for securing the heater heads to bosses 60 formed on the depending wings 134 of supporting member 133.

Means is provided for reciprocating the core plungers and in structures embodying the invention to the best advantage, the plungers are positively controlled. Although this may be accomplished in various ways, in the form shown, each plunger has a sliding bearing in a channel formed by walls 61 carried by or formed integral with the lower supporting member. Passing through each plunger is a bolt 62 carrying at the top a cam roller 63. In contact with these rollers is an internal track formed on a cam member 64 which is keyed to the central shaft to rotate therewith. It is this cam member 64 to which the pinion 33, before mentioned in connection with the drive, is bolted, as appears in Fig. 2. The track on member 64 is formed with a plurality of cam surfaces 65 which act on the rollers to withdraw the core plungers away from the stationary cores. Each cam surface is designed to cause withdrawal of the corresponding plunger just far enough and long enough to permit a crown from the chute 30 to drop down between the stationary core and the core plunger, whereupon the cam surface moves away from the roller. The plunger thus being released is forced toward the stationary core by a spring 66 which bears against the outer end of the plunger and against a pocket 67 in an annular spring seat 68 having a pocket for each plunger and secured to the top of the lower supporting member 129. This return movement of the plunger causes the latter to press against the crown that has just dropped in place and hold the same against the end of the stationary core, the end of the plunger fitting within the crown skirt. An alternating current being passed through the coil, as hereinafter described, sets up induced currents in the core, and eddy currents are thereby set up in the crown, which is held between the poles of the core, these eddy currents heating the crown to soften the adhesive material.

Figure 13:
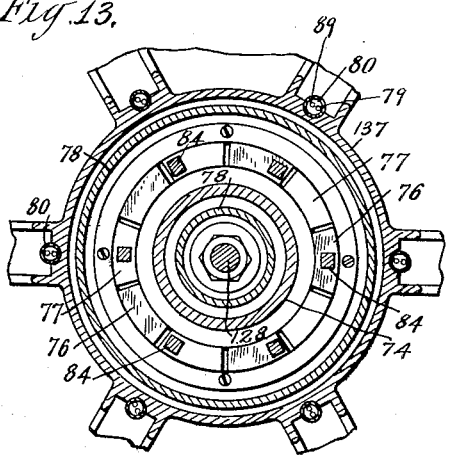
Fig. 13 is a longitudinal section through the commutator.

Since the operation of a number of heater heads simultaneously would deliver crowns in bunches, and would place a heavy intermittent load on the generator, the invention includes means for operating the heaters in overlapping rotation, in such manner that the generator load is practically constant, and structures embodying the invention to the best advantage, include coil exciting units, the numerical ratio of which to the coils comprise mutually prime numbers. Although capable of various constructions, in the embodiment illustrated, mounted on the central shaft 128 and suitably insulated therefrom is the hub 74 of a commutator wheel 75 which carries alternate segments 76 and 77 of conducting and non-conducting material, such as copper and bakelized micarta. This commutator wheel is immersed in oil contained in a cup 78 carried by the upper supporting member 137. The ratio of heaters to exciting units chosen in the present instance is 6:5, so there are six heater heads, five non-conducting segments and five conducting segments. Referring particularly to Figs. 2 and 12 each heater head is connected by one of its feed wires 79 which passes through a conduit 80 with a terminal 81 electrically connected in turn with a binding post 82. Attached to this binding post is a wire 83 connected to a vertical brush bar 84 carried by a housing 85 mounted in a bracket 86 and suitably insulated therefrom. This brush bar, which is formed of copper or other suitable material, is pressed against the commutator segments by a spring 87 also inclosed by the housing 85 and bearing against a top nut 88. The other feed wire 89 of the heater head coil is connected with a terminal 90 which is connected with one of the supply wires 91, the other supply wire 92 being in connection, through a binding post 93 and wire 94, with a horizontal brush bar 95 spring pressed against the top of the commutator wheel. As the commutator wheel rotates, its segments are brought successively in contact with the various brush bars 84 and each time a conducting segment passes a given brush bar the corresponding coil is excited. Since there are six brush bars for the six coils and five conducting segments, the coils are excited in overlapping rotation. Each coil is excited once for each one fifth revolution of the central shaft, the position of each brush bar differing from its neighbor by one sixth of a cycle, as appears in Fig. 13. With such a construction the crowns are not delivered in bunches and the generator load is practically constant. It is noted that the cam surfaces 65 are five in number, so that each core plunger is operated five times for each revolution of the central shaft to correspond with the five excitations of its coil.

The invention includes means for cooling the crowns under pressure after heating, and in structures embodying the invention to the best advantage, the crowns are automatically transferred from the heaters to the cooling means. While this may be accomplished in various ways, in the form shown, below each heating head is a cooling wheel 96 rotating in a vertical plane and acted upon by a cooling medium. Each wheel—the six being duplicates—is inclosed by a housing 97 and revolves on a stud 98 carried by a double ended boss 99 formed in the side of the lower supporting member. Formed in the edge of the wheel is a plurality of open faced crown receiving pockets 100 which are successively brought into register with the opening between the core plunger and stationary core of the heater head. The pressure for the crowns is derived from a cooling wheel spring comprising a plurality of prongs 101, equal in number to the pockets 100, each prong consisting of a triple leaf spring. At the end of each spring is secured a pressure block 102 designed to enter the corresponding pocket and fit within the skirt of the crown to press the same against the back of the pocket, the force of the spring normally holding the pressure block in the pocket.

Means is provided for withdrawing the pressure block from the pocket to permit a heated crown to drop in place, and in structures embodying the invention to the best advantage, the pressure block is withdrawn when the plunger withdraws by this movement of the plunger. Although capable of various constructions in the exemplification illustrated, the plunger carries a plate 17 having a hooked finger 18 positioned to engage a finger 19 carried by the pressure block. When the plunger withdraws, the finger 18 engages the finger 19, thereby withdrawing the pressure block from the pocket so that the crown released by the withdrawal of the plunger is free to drop into the pocket of the cooling wheel. Meanwhile the next unheated crown has dropped into the heater head and as the plunger moves in to engage the same, the pressure block is released and its spring forces it back into the pocket to engage the crown just received.

Means is provided for moving the cooling wheel in such manner that for each crown heated a pocket is presented under the heater head. Although capable of various constructions, in that illustrated, a ratchet and pawl movement is provided. The hub of the cooling wheel carries a ratchet wheel 104 held in place by a nut 105 in screw-threaded relation with the end of the hub. This ratchet wheel has teeth 106 of a number equal to the number of pockets in the cooling wheel. Acting on these teeth and pressed thereagainst by a spring 107 is a pawl 108 carried between the double arms of a bell crank lever 109. This lever is pivoted on a pin 110 set in the top of the base 125 and it has at its end a cam roller 111 acted on by a five pointed star cam 112 rotated by the central shaft. This cam acts to notch each cooling wheel ahead one pocket for each one-fifth revolution of the central shaft to correspond with the similar operation of each heater. After the roller is released by the cam, the parts are returned to normal position by a spring 113.

While the crowns are thus held under pressure in the pockets the cooling wheels are subjected to a suitable cooling medium. Although the invention is not limited to any particular medium, the embodiment shown provides for air cooling. In the base 125 is a large port 114 designed to have suitable connection with an air blower (not shown). The air thus received passes up inside the lower support and out against the cooling wheels via a plurality of ports 115 formed in the wall of the supporting member opposite each cooling wheel. This air is prevented from passing up through the apparatus by an air-retaining plate 116 carried by the central shaft, its circumference being in close proximity to a depending flange on the plunger spring seat, as appears in Fig. 2.

Means is provided for the removal of the cooled crowns from the cooling wheel, and in structures embodying the invention to the best advantage, the pressure blocks are withdrawn when the pockets are in a position to permit the released crowns to drop by gravity. Although capable of various constructions, in the embodiment illustrated, secured to the base 125 under each cooling wheel is a cam track 118 up which the fingers 19 ride, thereby to withdraw the pressure blocks and free the crowns. Registering with this position of the pockets of each cooling wheel, at which the crowns are released, is a delivery chute 119 bolted to the base and passing through a suitable opening to the interior of the base. The crowns being released, as just described, drop by gravity into these chutes which lead them to inspection belts or the like, as may be desired.

Means is provided for preventing the crowns from adhering to the withdrawing pressure blocks. While this may be done in various ways, the construction shown comprises a stripper plate 120 carried by the cooling wheel and having an opening 121 for each pocket. These openings are of a size to permit the passage of the pressure blocks but to prevent the passage of a crown. Consequently, if a crown tends to stick to the pressure block as it withdraws, it is removed therefrom by contact with the stripper plate, and drops into the delivery chute as described.

In operation, the supply wires being connected with a suitable source of alternating current, preferably of relatively high frequency, and power being applied to shaft 41, assembled crowns are fed to the three feed chutes 25. As the distributing wheel revolves, the crowns received from the chutes 25 are delivered to the six chutes 30 leading to the heater heads, the distributing wheel pausing intermittently, as before described. Considering any one of the six units, which are identical, the core plunger is withdrawn by the cam 65 and a crown drops into place between the two parts of the heater core. The rotating commutator brings a conducting segment under the corresponding brush bar to excite the coil and the cam 65 and the commutator are so arranged that the core plunger is back in place before the coil receives current, so that the crown is not subjected to the blow it would receive if the plunger were moved magnetically. While current is passing through the coil the crown is heated by the eddy currents set up therein, as before described. As soon as the conducting segment leaves the brush bar, the current is cut off from the coil and the next cam 65 withdraws the plunger. This movement of the plunger, through the interengagement of the fingers 18 and 19, withdraws the pressure block from the crown-receiving pocket of the cooling wheel. The heated crown, being freed by the plunger, drops into the cooling wheel pocket and the next crown drops into the heater. As the plunger moves in again, the pressure block is permitted to move into the pocket under the force of its spring to press the crown into the pocket. Before the next withdrawal of the plunger, the star wheel cam 112 has caused the cooling wheel to be notched ahead one step to place the next pocket in a position to receive the next crown. As the cooling wheel advances step by step the crowns held therein under pressure, are subjected to the influence of the air blast, and the cork disks are cemented in place. As a given pocket reaches the lower part of the wheel's path, the finger 19 rides up the cam track 118, the pressure block is withdrawn and the crown drops into the delivery chute 119. Meanwhile the five other units are operating in the same way, the phase of each differing by one-sixth of a cycle, as before described.

With such a construction, crowns are treated without excessive heat and without undue friction. The heating is uniform, the speed of operation is high, and the treatment is effective and reliable.

What is claimed is:

1. In an apparatus for treating crowns having an adhesive material for sticking the sealing disk in place, a magnetic circuit, means for inserting an assembled crown in said circuit, and means for changing the field of the circuit thereby to set up eddy currents in the metal shell of the crown.

2. In an apparatus for treating crowns having an adhesive material for sticking the sealing disk in place, a magnetic circuit including a core of a cross-section substantially equal in area to the face of the shell of the crown to be treated, means for inserting an assembled crown between the poles of said core, and means for changing the field of said circuit thereby to set up eddy currents in the metal shell of the crown.

3. In apparatus for treating crowns having an adhesive material for sticking the sealing disk in place, a magnetic circuit including a core having pole faces, one of which substantially fits inside the skirt of the crown, and means whereby a crown may be inserted between said pole faces.

4. In apparatus for treating crowns having an adhesive material for sticking the sealing disk in place, a magnetic circuit including a core one pole of which is a movable plunger, means whereby a crown may be inserted between the poles of said core, and means for positively controlling the movement of said plunger.

5. In apparatus for treating crowns having an adhesive material for sticking the sealing disk in place, a coil and a core having one pole movable to permit a crown to be received between said pole and the other pole.

6. In apparatus for treating crowns having an adhesive material for sticking the sealing disk in place, a magnetic circuit including a core having a cross-section substantially as great as the area of the crowns and a yoke of substantially greater cross section, and means whereby a crown may be inserted between the poles of said core.

7. In apparatus for treating crowns having an adhesive material for sticking the sealing disk in place, crown heating means including a coil and a core of which one pole is a movable plunger, means for withdrawing said plunger to permit a crown to be received between the plunger and the other pole, means for returning the plunger to hold the crown in place, and coil exciting means arranged to operate after said plunger has made its return movement.

8. In apparatus for treating crowns having an adhesive material for sticking the sealing disk in place, crown heating means including a coil and a core of which one pole is a movable plunger, means for intermittingly withdrawing said plunger, means for supplying crowns to the heating means at intervals corresponding with said plunger withdrawals, means for returning said plunger to hold the crown between it and the other pole and coil exciting means.

9. In apparatus for treating crowns having an adhesive material for sticking the sealing disk in place, crown heating means including a coil and a core of which one pole is a movable plunger, a feed chute registering with the opening between the poles of said core, means for withdrawing said plunger to permit a heated crown to drop away from the heating means and an unheated crown to drop from said feed chute into a position between the plunger and the other pole and means for returning said plunger to hold the crown in such position.

10. In apparatus for treating crowns having an adhesive material for sticking the sealing disk in place, means for setting up eddy currents in a crown to heat the same, including a core, one pole of which is a plunger for holding the crown in place during heating, means for withdrawing said plunger to release the heated crown, a carrier for carrying the heated crown away from the heating means, and means for subjecting the crown to pressure while in said carrier.

11. In apparatus for treating crowns having an adhesive material for sticking the sealing disk in place, means for setting up eddy currents in a crown to heat the same, including a core, one pole of which is a plunger for holding the crown in place during heating, means for withdrawing said plunger to release the heated crown, a carrier for carrying the crown away from the heating means, means for subjecting the crown to pressure while in said carrier, and means for releasing said crown pressing means.

12. In apparatus for treating crowns having an adhesive material for sticking the sealing disk in place, means for setting up eddy currents in a crown to heat the same, including a core, one pole of which is a plunger for holding the crown in place during heating, means for withdrawing said plunger to release the crown, a carrier having a plurality of crown-receiving pockets, a member pressed into each of said pockets for subjecting the heated crowns to pressure, and means for withdrawing said member, to permit a crown to enter the pocket, by the withdrawal of said plunger.

13. In apparatus for treating crowns having an adhesive material for sticking the sealing disk in place, means for setting up eddy currents in the crowns to heat the same, including a core, one pole of which is a movable plunger for holding the crowns in place during heating, a carrier rotating in a vertical plane having a plurality of crown-receiving pockets for receiving the heated crowns and carrying them away from the heating means, means for holding the crowns in said pockets under pressure, and means for releasing said holding means at a point to allow the crowns to drop out of said pockets by gravity.

14. In apparatus for treating crowns having an adhesive material for sticking the sealing disk in place, a plurality of heating heads for setting up eddy currents in the crowns, a brush for each heating head, and a commutator having a plurality of conducting segments, the numerical ratio of the heating heads to the conducting segments including mutually prime numbers.

15. In apparatus for treating crowns having an adhesive material for sticking the sealing disk in place, means for setting up eddy currents in the crowns to heat the same, including a core one pole of which is a movable plunger for holding a crown in place, means for withdrawing the plunger to release the crown, a cooling wheel having a plurality of crown-receiving pockets, and means for advancing said cooling wheel one pocket for each withdrawal of the plunger.

16. In apparatus for treating crowns having an adhesive material for sticking the sealing disk in place, means for setting up eddy currents in the crowns to heat the same, including a core one pole of which is a movable plunger for holding a crown in place, means for withdrawing the plunger to release a crown, a cooling wheel having a plurality of crown receiving pockets, means for advancing said cooling wheel one pocket for each withdrawal of said plunger, crown pressing means associated with said pockets, means for withdrawing said crown pressing means, and means for preventing the crowns from adhering to said crown pressing means.

17. In apparatus for treating crowns having an adhesive material for sticking the sealing disk in place, a plurality of heating heads including a coil and a core having a movable plunger, means for withdrawing said plungers to release heated crowns and to receive unheated crowns, means for returning said plungers to hold the crowns in position between the poles of the cores, and means for exciting said coils in overlapping relation.

18. In apparatus for treating crowns having an adhesive material for sticking the sealing disk in place, a plurality of heating heads for setting up eddy currents in the crowns, including a coil and a core having a movable plunger, cams for withdrawing said plunger, springs for returning the plunger, a cooling wheel associated with each heating head having a plurality of crown-receiving pockets, and means including a cam for advancing each cooling wheel one pocket for each withdrawal of the corresponding plunger.

19. In apparatus for treating crowns having an adhesive material for sticking the sealing disk in place, a plurality of heating heads for setting up eddy currents in the crowns and including a coil, and means for exciting said coils in overlapping relation.

20. In apparatus for treating crowns having an adhesive material for sticking the sealing disk in place, a plurality of heating heads for setting up eddy currents in the crowns and including a coil, and a plurality of coil exciting elements, the numerical ratio of the coils to the exciting elements including mutually prime numbers.

21. In apparatus for treating crowns having an adhesive material for sticking the sealing disk in place, a plurality of heating heads for setting up eddy currents in the crowns and including a coil, and a plurality of coil exciting elements, the numerical ratio of the coils to the exciting elements including mutually prime numbers, said numbers being indivisible one in the other.

22. In apparatus for treating crowns having an adhesive material for sticking the sealing disk in place, a plurality of heating heads for setting up eddy currents in the crowns and including a coil, and a plurality of coil exciting elements, the numbers of said elements and the numbers of said coils being indivisible one in the other.

23. In an apparatus for treating crowns having an adhesive material for sticking the sealing disk in place, a plurality of crown heating units, a chute associated with each unit for delivering crowns thereto, a crown supply wheel having a plurality of crown holding pockets, means for rotating said wheel to bring the pockets into register with said chutes, and means for retaining the crowns in the pockets when the pockets are not in register with any of said chutes.

24. In an apparatus for treating crowns having an adhesive material for sticking the sealing disk in place, a plurality of crown heating units, each including a core one pole of which is a movable plunger and an exiting coil, a cooling wheel associated with each heating unit for receiving the hot crowns therefrom, and means for simultaneously cutting off the current from the coil of one unit, withdrawing the corresponding plunger to free the crown and feeding the corresponding cooling wheel one step ahead.

25. In an apparatus for treating crowns having an adhesive material for sticking the sealing disk in place, a plurality of crown heating units, a support above said heating units having an annular grooved crown-supporting surface, a chute associated with each heating unit and opening out of said crown supporting surface, a rotating crown supply wheel having a plurality of substantially vertical crown receiving pockets positioned to register with said chutes as the wheel rotates, and a plurality of chutes registering with the tops of said pockets for delivering crowns thereto.

26. In an apparatus for treating crowns having an adhesive material for sticking the sealing disk in place, means for setting up eddy currents in a crown to heat the same, including a core one pole of which is a plunger for holding the crown in place during heating, a rotating cooling wheel having a plurality of crown receiving pockets, a spring-pressed block associated with each pocket for pressing crowns in said pockets, means for withdrawing said plunger to release a crown, a hook connected with said plunger, and a hook connected with each of said blocks for engagement by said plunger hook, whereby the block is withdrawn to receive the crown released by the withdrawal of the plunger.

27. In an apparatus for treating crowns having an adhesive material for sticking the sealing disk in place, means for setting up eddy currents in the crowns to heat the same including a core one pole of which is a movable plunger for holding the crowns in place during heating, means for withdrawing said plunger to release a heated crown, a vertical rotating cooling wheel having a plurality of crown receiving pockets, a spring pressed block associated with each pocket for pressing the crowns into the pockets, a hook connected with each of said blocks, a hook connected with said plunger for engaging said first named hooks to withdraw a block to receive the crown released by the withdrawal of the plunger, and a cam track adjacent the bottom of said wheel for engaging said hooks to withdraw the blocks for the release of the cooled crowns.

28. In an apparatus for treating crowns having an adhesive material for sticking the sealing disk in place, a plurality of crown heating units each including a coil and a core, one pole of which is a movable plunger for holding the crown in place during heating, a rotating crown supply wheel having a plurality of vertical crown receiving pockets, a chute leading to each crown heating unit and with which said pockets register as the supply wheel rotates, a vertical cooling wheel below each of said crown heating units having a plurality of crown receiving pockets, ratchet means for intermittently advancing said cooling wheel, a rotating cam member for withdrawing said plungers to release a heated crown to the cooling wheel and to receive another crown from the supply wheel, and a central shaft for rotating said supply wheel and said cam member and operating said ratchet means.

In testimony whereof, I have hereunto set my hand.

DONALD J. ANGUS.